F. MARRIOTT.
Improvement in Apparatus for Sugar-Coating Pills.
No. 116,204. Patented June 20, 1871.
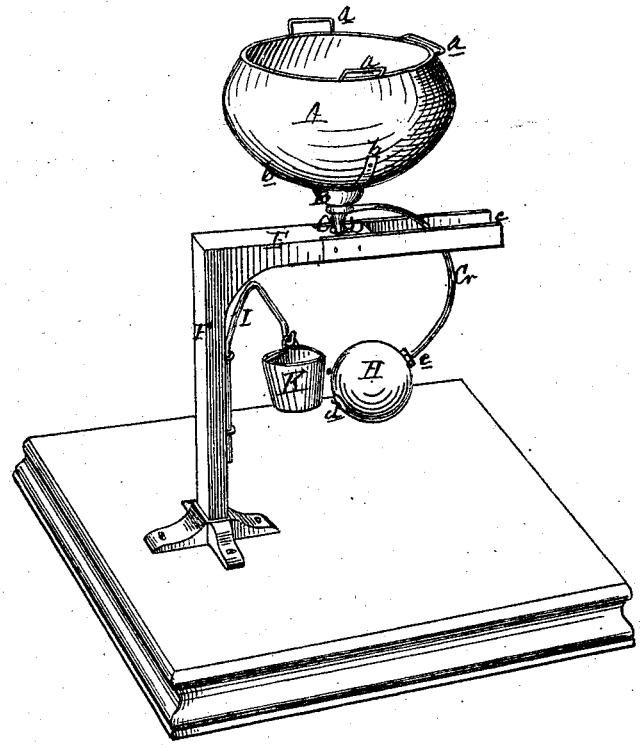
Attest
Myron H. Church
Elihu Cox
Inventor
F. Marriott 116,204

UNITED STATES PATENT OFFICE.

FREDERICK MARRIOTT, OF DETROIT, MICHIGAN.

IMPROVEMENT IN APPARATUS FOR SUGAR-COATING PILLS.

Specification forming part of Letters Patent No. 116,204, dated June 20, 1871.

*To all whom it may concern:*

Be it known that I, FREDERICK MARRIOTT, of Detroit, in the county of Wayne and State of Michigan, have invented a new and useful Improvement in Apparatus for Sugar-Coating Pills; and I do declare that the following is a true and accurate description thereof, reference being had to the accompanying drawing and to the letters of reference marked thereon and being a part of this specification, in which my invention is shown in perspective.

The nature of this invention relates to an improvement in apparatus for sugar-coating pills or any other article of a globular form, and for forming the pill mass or other substances into the round form for coating.

The apparatus can also be used in the manufacture of candies and confections which are made in a spherical form.

The invention consists, first, in the peculiar arrangement of the pan with a pivot and socket, and the adjustable counter-balance, by means of which the pan is made susceptible of an inclined circular motion, whereby a centrifugal rotary motion is communicated to the contents thereof; second, in combination with said pan, pivot, and socket, the frame to which the same is attached; third, in combination with the frame, the adjustable crane and fire-pot; fourth, in the peculiar construction, arrangement, and operation of the various parts, as more fully hereinafter described.

In the accompanying drawing, A is a spherical pan with the upper section cut off, as shown, and provided with the handles $a$, by means of which the pan is moved. The bottom of the pan is supported by the braces $b$ and the boss B, in which is inserted the pivot C, which rotates in the socket D, which is fixed on the arm E, which projects from the standard F or other suitable support. The arm E has a slot, $c$, on the outer end, within which the curved arm G works. This curved arm G is secured to the bottom of the pan A in any convenient or desired way, and bears, on its lower end, the counter-balance H, which is secured thereon by the nuts $d$ and $e$, so that it may be adjusted or changed, as may be required, by the weight of the material in the pan A. The crane I is secured to the standard F, and the fire-pot K suspended from said crane I so the fire-pot K can be swung under the arm E and above the counter-balance H, in order to heat the pan and its contents, as desired, or to be removed when further heat is not required.

What I claim as my invention, and desire to secure by Letters Patent, is—

1. The peculiar arrangement of the pan A with the pivot C and socket D, curved arm G, and adjustable counter-balance H, as and for the purposes above set forth.

2. The combination of the above-named parts with the slotted arm E supporting the socket D, as and for the purposes substantially as set forth.

3. The combination of the pan A, pivot C, socket D, curved arm G, counter-balance H, slotted arm E with the adjustable crane I and fire-pot K, substantially as and for the purposes set forth.

FREDERICK MARRIOTT.

Witnesses:
MYRON H. CHURCH,
ELIHU COX.